United States Patent [19]

Eckstein et al.

[11] Patent Number: 4,783,196

[45] Date of Patent: Nov. 8, 1988

[54] HIGHLY CONCENTRATED STABLE SOLUTIONS OF COLOR-FORMING AGENTS: FOR PRESSURE-SENSITIVE RECORDING MATERIALS

[75] Inventors: Udo Eckstein, Koeln; Hubertus Psaar, Leverkusen, both of Fed. Rep. of Germany

[73] Assignee: Bayer Aktiengesellshcaft, Leverkusen, Fed. Rep. of Germany

[21] Appl. No.: 10,932

[22] Filed: Feb. 5, 1987

[30] Foreign Application Priority Data

Feb. 21, 1986 [DE] Fed. Rep. of Germany ....... 3605552

[51] Int. Cl.[4] ........................ B41M 5/16; C09B 11/04; C09B 67/44

[52] U.S. Cl. ........................................... 8/527; 8/506; 8/580; 8/583; 8/614; 8/617; 8/657; 8/688; 106/19; 260/390; 260/395

[58] Field of Search .................... 8/527, 580, 583, 614, 8/617

[56] References Cited

U.S. PATENT DOCUMENTS

| | | | |
|---|---|---|---|
| 2,800,457 | 7/1957 | Green et al. | 106/19 |
| 2,800,458 | 7/1957 | Green et al. | 106/19 |
| 4,295,662 | 10/1981 | Tutty | 503/208 |
| 4,298,651 | 11/1981 | Tutty | 503/208 |
| 4,327,939 | 5/1982 | Ehrhardt et al. | 503/213 |
| 4,339,275 | 7/1982 | Tutty | 106/21 |
| 4,343,494 | 8/1982 | Ehrhardt et al. | 503/209 |
| 4,480,002 | 10/1984 | Asano et al. | 428/402.2 |

*Primary Examiner*—A. Lionel Clingman

*Attorney, Agent, or Firm*—Sprung Horn Kramer & Woods

[57] ABSTRACT

Highly concentrated stable solutions of color-forming agents of the general formula

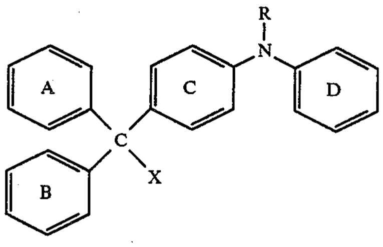

I wherein x denotes hydroxyl, alkoxy, alkenyloxy, aralkoxy, cycloalkoxy, aryloxy, acyloxy, alkylamino, dialkylamino, acrylamino, aralkylamino or arylamino and R denotes alkyl, alkenyl or aralkyl, further isocyclic or heterocyclic rings can be fused onto the rings A, B, C and D and the cyclic and acyclic radicals and the rings A, B, C and D can carry further non-ionic substituents which are customary in dyestuff chemistry, or mixtures thereof, in water-insoluble organic solvents from the group comprising optionally chlorinated hydrocarbons, vegetable oils and phthalic acid esters are used for the preparation of pressure-sensitive recording materials.

5 Claims, No Drawings

HIGHLY CONCENTRATED STABLE SOLUTIONS OF COLOR-FORMING AGENTS: FOR PRESSURE-SENSITIVE RECORDING MATERIALS

The invention relates to highly concentrated stable solutions of colour-forming agents of the general formula

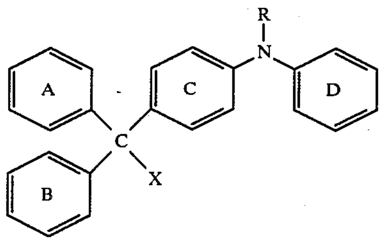

I wherein x denotes hydroxyl, alkoxy, alkenyloxy, aralkoxy, cycloalkoxy, aryloxy, acyloxy, alkylamino, dialkylamino, acylamino, aralkylamino or arylamino and R denotes alkyl, alkenyl or aralkyl, further isocyclic or heterocyclic rings can be fused onto the rings A, B, C and D and the cyclic and acyclic radicals and the rings A, B, C and D can carry further non-ionic substituents which are customary in dyestuff chemistry, or mixtures thereof, in water-insoluble organic solvents from the group comprising optionally chlorinated hydrocarbons, vegetable oils and phthalic acid esters, their preparation and their use for the preparation of pressure-sensitive recording materials and microcapsules with capsule walls which are produced by interfacial reaction processes.

Non-ionic substituents which are customary in dyestuff chemistry are, for example, halogen, hydroxyl, alkoxy, alkenyloxy, aryloxy, aralkoxy, cycloalkoxy, heteryloxy, aryl, heteryl, alkylmercapto, arylmercapto, aralkylmercapto, alkylsulphonyl, cyano, carbamoyl, alkoxycarbonyl, amino, which can be substituted by 1 or 2 alkyl, cycloalkyl, aryl or aralkyl groups, preferably to form a 5- or 6-membered ring, or the substituents of which can by cyclized, acylamino, alkenyloxy, alkylcarbonyloxy and arylcarbonyloxy, and, as substituents of the rings, also alkyl, aryl, aralkyl, nitro, alkenyl and arylvinyl.

Alkyl represents $C_1$–$C_{30}$-alkyl, in particular $C_1$–$C_{12}$-alkyl.

The alkyl radicals and the alkyl radicals in alkoxy, alkylthio, alkylamino, alkanoylamino, alkylsulphonyl and alkoxycarbonyl groups can be branched and can be substituted, for example, by fluorine, chlorine, $C_1$- to $C_4$-alkoxy, cyano or $C_1$–$C_4$-alkoxycarbonyl.

Aralkyl is, in particular, phenyl-$C_1$- to -$C_4$-alkyl, which can be substituted in the phenyl nucleus by halogen, $C_1$- to $C_4$-alkyl and/or $C_1$- to $C_4$-alkoxy.

Cycloalkyl is, in particular, cyclopentyl or cyclohexyl, optionally substituted by methyl.

Alkenyl is, in particular, $C_2$–$C_5$-alkenyl, which can be monosubstituted by hydroxyl, $C_1$- to $C_4$-alkoxy, cyano, $C_1$- to $C_4$-alkoxycarbonyl, chlorine or bromine. Vinyl and allyl are preferred.

Halogen is, in particular, fluorine, chlorine or bromine, preferably chlorine.

Aryl is, in particular, phenyl or naphthyl which is optionally substituted by one to three substituents from the group comprising $C_1$- to $C_4$-alkyl, chlorine, bromine, cyano, $C_1$- to $C_4$-alkoxycarbonyl and $C_1$- to $C_4$-alkoxy.

Alkoxy is, in particular, $C_1$–$C_{12}$-alkoxy which is optionally substituted by chlorine or $C_1$–$C_4$-alkoxy.

Acyl is, in particular, $C_1$- to $C_4$-alkylcarbonyl or $C_1$- to $C_4$-alkoxycarbonyl, or aminocarbonyl or aminosulphonyl which is optionally mono- or disubstituted by $C_1$–$C_4$-alkyl, phenyl or benzyl.

Alkoxycarbonyl is, in particular, $C_1$- to $C_4$-alkoxycarbonyl which is optionally substituted by hydroxyl, halogen or cyano.

Heteryl is, in particular, pyridyl, pyrimidyl, pyrazinyl, triazinyl, indolyl, imidazolyl, oxazolyl, thiazolyl, triazolyl, thiadiazolyl or tetrazolyl, which can be benzofused, or their partly hydrogenated or completely hydrogenated derivatives.

The rings can be substituted by non-ionic substituents, in particular by $C_1$–$C_4$-alkyl, $C_1$–$C_4$-alkoxy, cyano, nitro or halogen.

Of the colour-forming agents of the formula I, compounds which are of particular importance are those of the formula

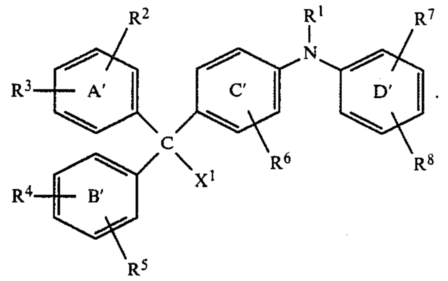

(II)

wherein $X^1$ denotes hydroxyl, $C_1$–$C_{12}$-alkoxy which is optionally substituted by chlorine or $C_1$–$C_4$-alkoxy, $C_2$–$C_{12}$-alkenyloxy, benzyloxy which is optionally substituted by $C_1$–$C_4$-alkyl, $C_1$–$C_4$-alkoxy or halogen or phenethyloxy, $R^1$ denotes $C_1$–$C_{12}$-alkyl or benzyl, $R^2$, $R^4$, $R^6$ and $R^7$ independently of one another denote hydrogen, chlorine, $C_1$–$C_{12}$-alkyl, $C_1$–$C_{12}$-alkoxy, phenoxy, benzyloxy or a radical of the formula

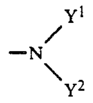

$R^3$, $R^5$ and $R^8$ independently of one another denote hydrogen, chlorine, $C_1$–$C_{12}$-alkyl, $C_2$–$C_{12}$-alkenyl, $C_1$–$C_{12}$-alkoxy or $C_2$–$C_{12}$-alkenyloxy, or phenyl, benzyl, phenoxy or benzyloxy which is optionally substituted by chlorine, $C_1$–$C_{12}$-alkyl or $C_1$–$C_{12}$-alkoxy, or cyclohexyloxy or cyclopentyloxy which is optionally substituted by $C_1$–$C_{12}$-alkyl, or $C_1$–$C_{12}$-alkylmercapto or a radical of the formula

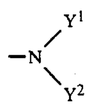

$Y^1$ and $Y^2$ independently of one another denote $C_1$–$C_{12}$-alkyl which is optionally substituted by chlorine, cyano, $C_1$–$C_4$-alkoxycarbonyl or $C_1$–$C_4$-alkoxy, or cyclohexyl, phenyl or benzyl, which can be substituted by chlorine, $C_1$–$C_{12}$-alkyl or $C_1$–$C_{12}$-alkoxy, or $R^2$ and $R^3$ denote members which, together with ring A', and/or $R^4$ and $R^5$ denote members, which, together with ring B', are necessary to complete a ring system of one of the following formulae

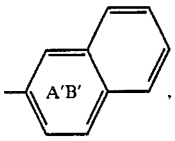
,
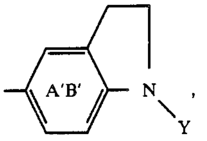
,
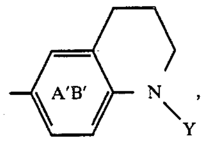
,
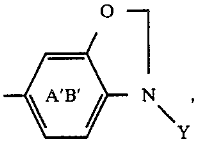
,
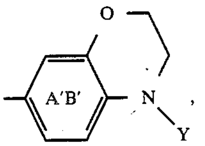
,
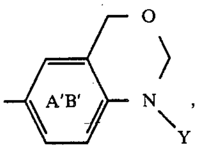
,
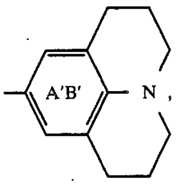
,
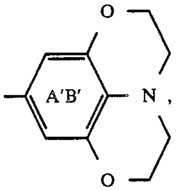
,
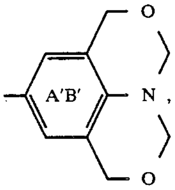
,
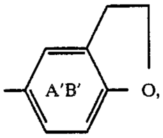
,
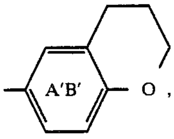
,
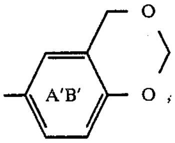
;
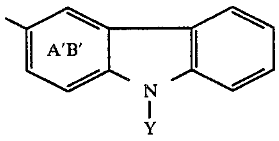
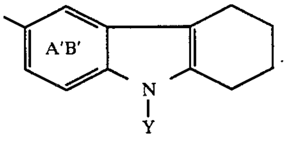
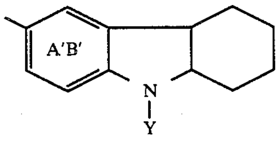
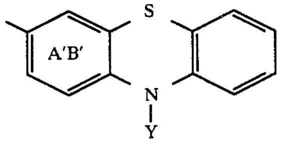

Wherein in Y represents $C_1$–$C_{12}$-alkyl, which can be substituted by chlorine, cyano, $C_1$–$C_4$-alkoxycarbonyl or $C_1$–$C_4$-alkoxy, or cyclohexyl, phenyl or benzyl, which can be substituted by chlorine, $C_1$–$C_{12}$-alkyl or $C_1$–$C_{12}$-alkoxy, and the saturated ring component can carry up to 4 radicals from the group comprising chlorine, $C_1$- to $C_4$-alkyl, $C_1$- to $C_4$-alkoxy and phenyl, or

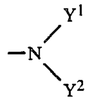

denotes a pyrrolo, pyrrolidino, piperidino, pipecolino, morpholino, pyrazolo or pyrazolino radical which is optionally substituted by chlorine, $C_1$- to $C_4$-alkyl or phenyl.

Examples of radicals which are substituted in the saturated ring are:

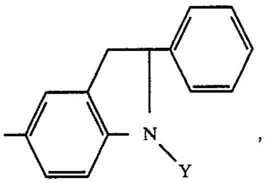
,
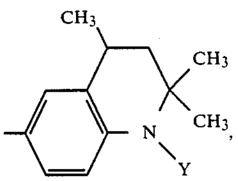
,
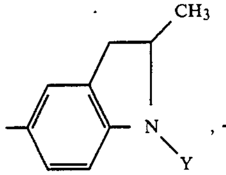
,
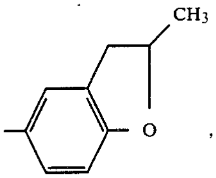
,
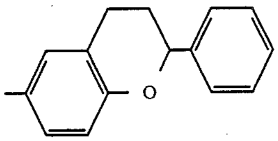
or
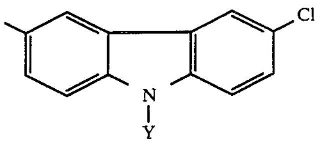

Particularly preferred colour-forming agents are those of the formula

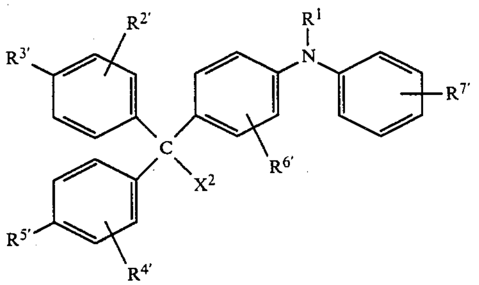
III wherein $X^2$ denotes hydroxyl or $C_1$–$C_{12}$-alkoxy, $R^{3'}$ denotes hydrogen, chlorine, $C_1$–$C_{12}$-alkyl, $C_1$–$C_{12}$-alkoxy, benzyloxy, phenoxy or a radical of the formula

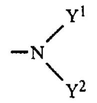

$R^{5'}$ denotes $C_1$–$C_{12}$-alkoxy, benzyloxy or a radical of the formula

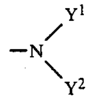

$R^{2'}$, $R^{4'}$, $R^{6'}$ and $R^{7'}$ independently of one another denote hydrogen, chlorine, $C_1$–$C_{12}$-alkyl, $C_1$–$C_{12}$-alkoxy, $C_1$–$C_4$-alkylamino or di-$C_1$–$C_{12}$-alkylamino, or $R^{2'}$ and $R^{3'}$ denote members which, together with the benzene ring to which they are bonded, are required to complete a ring system of one of the formulae

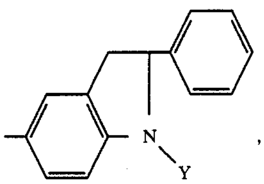
,
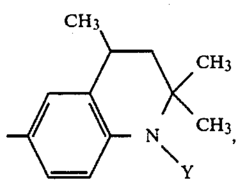

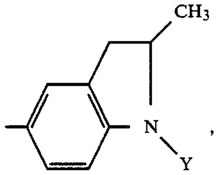
,
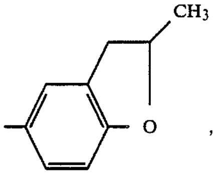
,

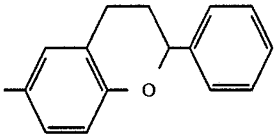
or

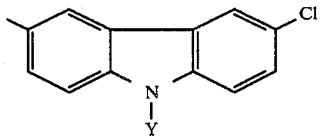

and $R^1$, X, $Y^1$ and $Y^2$ have the abovementioned meaning.

Suitable (chloro)hydrocarbons for the solutions according to the invention are high-boiling (150°–400° C.) (chloro)hydrocarbons which are liquid at room temperature, for example paraffins, in particular $C_{10}$–$C_{20}$-n-paraffins, $C_{10}$–$C_{20}$-iso-paraffins and $C_{10}$–$C_{17}$-chloroparaffins with a chlorine content of 15–70% by weight and their technical grade mixtures, for example kerosine ($C_{10}$–$C_{16}$-paraffin) or white oils (50–70% paraffins and 30–50% naphthenes), aromatic hydrocarbons which contain alkyl groups with preferably 1–18 carbon atoms, such as alkyl-biphenyls, in particular iso-propylbiphenyl and tert.-butylbiphenyl, dialkyl-biphenyls, in particular di-isopropylbiphenyl and di-tert.-butyl-biphenyl, alkyl- and dialkyl-naphthalenes, in particular isopropylnaphthalene and di-tert.-butylnaphthalene, alkylbenzenes, in particular dodecylbenzene, hydrogenated and partly hydrogenated terphenyls, in particular cyclohexyldiphenyl, and diarylalkanes, in particular diphenyl ethane or ethyldiphenylmethane.

Suitable vegetable oils are, for example, linseed oil, sesame oil, olive oil, palm oil, groundnut oil, thistle oil, sunflower oil, castor oil, maize germ oil, soya bean oil and rape oil.

Suitable esters of phthalic acid are, for example, those of $C_2$–$C_{18}$-aliphatic alcohols, in particular dibutyl phthalate.

Preferred highly concentrated solutions contain 10–50% by weight, in particular 10–35% by weight, of colour-forming agent.

The invention also relates to compounds of the formula (III) wherein $R^1$, $X^2$ and $R^{2'}$–$R^{7'}$ have the abovementioned meaning but $R^{3'}$ and $R^{5'}$ do not simultaneously represent $OCH_3$ or $OC_2H_5$ if $R^{2'}$ and $R^{4'}$ denote hydrogen, and furthermore $R^{3'}$ and $R^{5'}$ do not simultaneously represent $OCH_3$ if $R^{2'}$ denotes hydrogen and $R^{4'}$ denotes 2-$OCH_3$.

The invention furthermore relates to a process for the preparation of the highly concentrated colour-forming agent solutions according to the invention by reaction of dyestuff salts of the formula

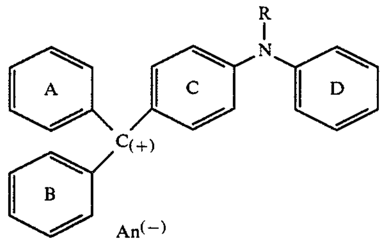
(IV)

with bases of the formula

MeX (V)

wherein

R, X and the rings A, B, C and D have the abovementioned meanings,

Me denotes an alkali metal or alkaline earth metal, in particular sodium or potassium, and $An^{(-)}$ denotes an anion from the series comprising Cl, Br, acetate, sulphate, phosphate and

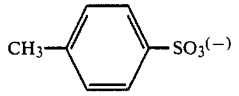

in an organic reaction medium customary for these reactions, and either (a) a water-insoluble solvent contained in the solutions according to the invention is added, the resulting layers are separated after the reaction—if appropriate after addition of water—and the solution, according to the invention, of the colour-forming agent in the water-insoluble solvent is then obtained directly, or (b) the reaction is carried out in the absence of a water-insoluble solvent contained in the solutions according to the invention, the colour-forming agent is separated off from the reaction medium after the reaction and the water-insoluble solvent is then added.

Suitable reaction media are polar solvents, such as dimethylformamide, dimethylsulphoxide, hexamethylphosphoric acid triamide and alkanols. Dimethylformamide and $C_1$–$C_{18}$-alkanols are preferred.

Suitable reaction temperatures are between 20° and 120° C., and are preferably 30°–80° C.

A particularly advantageous preparation process comprises a procedure in which, in a one-pot reaction, ketones of the formula

VI

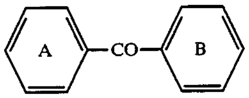

are condensed with amines of the formula

VII

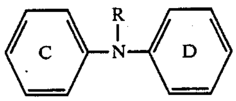

or ketones of the formula

VIII

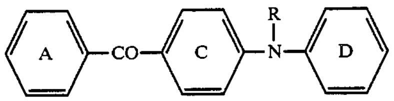

are condensed with a compound of the formula

IX

in the presence of a condensing agent which donates an anion $An^{(-)}$, to give the colour salts of the formula (IV), and these are reacted with the bases (V) as described above, without intermediate isolation.

Phosphorus oxychloride and/or diphosphorus pentoxide are thereby preferably employed as condensing agents.

The resulting colour-forming agent solutions can be marketed without further purification and used in pressure-sensitive recording materials, in particular in microencapsulated materials.

The colour-forming agent solutions are preferably enclosed in microcapsules, the walls of which are produced by interfacial creation processes.

Interfacial reactions, for example the condensation of organic acid chlorides and amines, are known. A summary of the interfacial reactions so far disclosed can be found in G. Baxter, Microencapsulation Processes and Applications, published by J. E. Vandegaer.

Those microcapsules whose shells consist of polyaddition products of polyisocyanates and polyamines are used with particular preference.

Processes for producing microcapsules by the interfacial polyaddition of polyisocyanates and polyamines are for example described in German Published Specification Nos. 1,109,335; 2,251,381; 2,242,910; 2,120,921; 2,311,712 and 2,523,586.

It has been found that the colour-forming agents of the formula (I) are surprisingly readily soluble in the water-insoluble organic solvents mentioned. Solutions with a colour-forming agent content of up to 50% by weight, in particular 15–50% by weight, can be obtained.

They have an excellent stability, even under variations in temperature.

For use in the recording materials, they are diluted with the solvents of the solutions according to the invention to concentrations of about 3–10% by weight.

On contact with an acid developer, that is to say an electron acceptor, the solutions according to the invention give intense blue, green-blue, green, violet or red colour shades which are excellently fast to sublimation and light. Navy blue, grey or black dyeings can be achieved by mixtures with one another.

They are also useful when mixed with one or more other known colour-forming agents, for example 3,3-bis-(aminophenyl)-phthalides, 3,3-bis-(indolyl)-phthalides, 3-amino-fluoranes, 2,6-diamino-fluroranes, leucoauramines, spiropyrans, spirodipyrans, chromenoindoles, phenxoyazines, phenothiazines, carbazolylmethanes or other triaryl-methane leuco-dyestuffs, to give green, violet, blue, navy blue, grey or black dyeings.

Both on phenolic substrates and on activated clays they have a good colour intensity, high fastness to light and an excellent stability towards ageing and CB. They are suitable for a pressure-sensitive recording material, which can be either a copying or a recording material. Their speed of development differs according to the substituents. In general, however, they are distinguished by a high speed of development, with a simultaneously reduced sensitivity of the recording materials towards unintentional premature development.

Pressure-sensitive recording materials are known, for example, from U.S. Pat. Nos. 2,800,457 and 2,800,458.

The solutions according to the invention offer diverse advantages:

In comparison with the pulverulent colour-forming agent formulations, they allow clean and easy handling. In addition to the colour-forming agent, they consist of a solvent suitable for microencapsulation and can therefore easily be diluted or blended to the desired use concentration by means of metering devices. They enable very deep prints to be produced, since by using highly concentrated solutions, microcapsules with a colour-forming agent content above the previously customary content of 3–7% by weight can be prepared.

EXAMPLE 1

12.1 g (0.05 mol) of 4,4'-dimethoxybenzophenone and 9.2 g (0.05 mol) of N-methyl-diphenylamine are suspended in 38.2 g (0.25 mol) of phosphorus oxychloride, and 14.2 g (0.1 mol) of phosphorus pentoxide are added at room temperature. The melt is stirred at this temperature for 18 hours and discharged onto 500 ml of ice-water and the mixture is stirred at room temperature for about a further 10–12 hours, until the dyestuff separates out as crystals. Filtration with suction, washing with water and drying in vacuo at 40° C. gives 21.8 g (98% of theory) of a reddish powder of melting point 78°–81° C.

13.4 g (0.1 mol) of 30% strength sodium hydroxide solution are slowly added dropwise to a solution of 17.8 g (0.04 mol) of this dyestuff in 140 ml of dimethylformamide at 40° C. The mixture is stirred at 40° C. for 2 hours and filtered and the filtrate is discharged onto 500 ml of ice-water. On addition of 25 g of sodium chloride, an almost colourless precipitate separates out and is filtered off. It is rinsed with 100 ml of 2% strength sodium hydroxide solution and cold water. Drying in vacuo at 40° C. gives 14.2 g (83.4% of theory) of an almost colourless crystalline powder of melting point 48°-54° C. and of the formula (1)

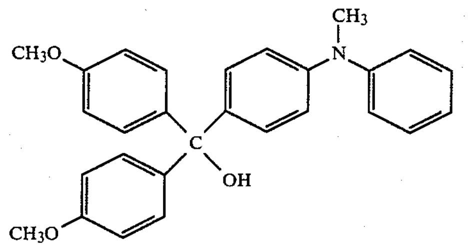

A solution in glacial acetic acid becomes red-violet with $\lambda_{max}=556$ nm and $\lambda_2=430$ nm. $^1$H-NMR spectrum ($CDCl_3$): δ=1.64 ppm (S, 1H), δ=3.26 ppm (S, 3H), δ=3.73 ppm (S, 6H).

11.4 g of the moist press-cake of the carbinol base of the formula (1) are dissolved in 32 g of chloroparaffin ($C_{13}$–$C_{18}$-n-paraffin with about 45% by weight of chlorine) or diisopropylnaphthalene. After removal of the residual water in vacuo at 40°-50° C., solutions which contain about 20% of colour-forming agent are obtained. The solutions can easily be diluted to the customary use concentrations in recording materials of, for example, 3% or 5% with white oil (62% n-paraffin/38% naphthene) or kerosine ($C_{10}$–$C_{16}$-n-paraffin), and can be encapsulated by customary methods. A strong red-violet colour is developed on acid clay.

EXAMPLE 2

If 9.6 g of sodium butylate are used instead of 13.4 g of 30% strength sodium hydroxide solution in the preparation of the carbinol base derivative in Example 1, the reaction gives a pale yellow oil which can be dissolved to the extent of 35% in chloroparaffin ($C_{13}$–$C_{18}$-n-paraffin with about 45% of chlorine), 30% in diisopropyldiphenyl and 30% in linseed oil. The compound corresponds to the formula (2)

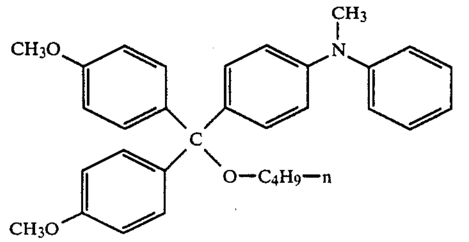

EXAMPLE 3

44.3 g (0.1 mol) of the dyestuff described in Example 1 (4,4'-dimethoxy-4''-N-methyl-N-phenyl-triphenylmethyl chloride) and 93 g of diisopropylnaphthalene are dissolved in 500 ml of methanol. 40 g (0.3 mol) of 30% strength sodium hydroxide solutions are added dropwise at 40° C. and the mixture is stirred at this temperature for 6 hours. Thereafter, 120 ml of water are added, the mixture is stirred for 30 minutes and the organic phase which separates out as the lower phase is separated out. After removal of the residual water in vacuo at 40° C. and filtration with suction, 126 g of a yellowish solution containing 29.7% of colour-forming agent which can be developed are obtained. (According to the $E_1^1$ measurement in glacial acetic acid). The $^1$H-NMR spectrum shows that the colour-forming agent consists of a mixture of about 90% of 4,4'-dimethoxy-4''-N-methyl-N-phenyltriphenyl-carbinol methyl ether (formula 1: $OCH_3$ instead of OH) and about 10% of carbinol base of the formula 1.

The solution can readily be diluted to use concentrations in recording materials of 3%, 5% or 7% with further diisopropylnaphthalene, chloroparaffin ($C_{12}$–$C_{18}$-n-paraffin, about 45% of chlorine), sesame oil or linseed oil, and incorporated into polyamide, gelatine, polyurethane or polyurea microcapsules. Strong red-violet colour shades are obtained on acid clay or bisphenol A.

EXAMPLE 4

A suspension of 13.6 g (0.05 mol) of 2,4,4'-trimethoxy-benzophenone and 9.2 g (0.05 mol) of N-methyldiphenylamine in 38.2 g (0.25 mol) of phosphorus oxychloride are taken and 14.2 g (0.1 mol) of phosphorus pentoxide are added in portions at room temperature. The reaction mixture is warmed to 40° C. and stirred at this temperature for 15 hours. Thereafter, it is discharged onto 600 ml of ice-water and subsequently stirred at room temperature for about 10 hours and the colour resin which has separated out is decanted off. The residue is treated with 600 ml of 10% strength hydrochloric acid and 300 ml of water in succession. Drying in vacuo at 40° C. and grinding gives 22 g of a dark red powder with a melting range of 56°-62° C.

A solution of 14.2 g (0.03 mol) of this dyestuff in 80 ml of dimethylformamide is filtered, and 18 g (0.09 mol) of 20% strength sodium hydroxide solution are slowly added at room temperature. The mixture is stirred at 40° C. for 1 hour and filtered and the filtrate is poured into 600 ml of ice-water. 50 g of sodium chloride are added and the mixture is stirred briefly. The pale yellow crystalline precipitate is filtered off with suction and washed with 100 ml of 2% strength sodium hydroxide solution and 200 ml of water. Drying gives 11.9 g (86.8% of theory) of a pale yellow powder of melting point 107°-112° C. (from methylcyclohexane), and of the formula (3)

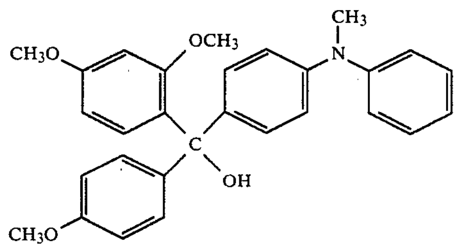

A solution in glacial acetic acid becomes dark violet with $\lambda_{max}=563$ nm and $\lambda_2=456$ nm. $^1$H-NMR spectrum ($CDCl_3$): δ=3.27 ppm (S, 3H), δ=3.64 ppm (S, 3H), δ=3.73 ppm (S, 3H), δ=3.77 ppm (S, 3H) and δ=5.04 ppm (S, 1H). 10 g of the dried press-cake of the formula (3) can be dissolved completely in 40 g of chloroparaffin ($C_{13}$–$C_{18}$-n-paraffin containing about 45% by weight of chlorine). Stable chloroparaffin solutions which contain 20% of colour-forming agent and can easily be diluted to the customary use concentrations in recording materials (3% or 5%) are obtained in this manner. A strong dark-red to violet colour with high CF and CB fastnesses is achieved on acid clay.

EXAMPLE 5

20–30% strength solutions of the following colour-forming agents in chloroparaffin ($C_{13}$–$C_{18}$-n-paraffin containing about 45% of chlorine), diisopropylnaphthalene, diisopropyl-biphenyl, sesame oil or linseed oil are prepared analogously to Example 1, 2 and 3:

TABLE 1

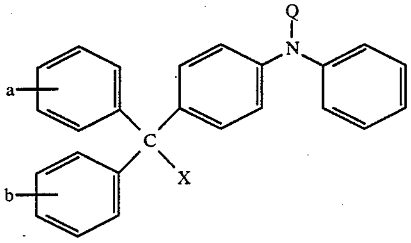

| Formula No. | a | b | Q | X | Colour shade on acid clay or bisphenol A | $\lambda_{max}$ in glacial acetic acid |
|---|---|---|---|---|---|---|
| 4 | 3-$OCH_3$<br>4-$OCH_4$ | 4-$OCH_3$ | $CH_3$ | $OCH_3$ | lilac | 568 nm |
| 5 | 3-$OCH_3$<br>4-$OCH_3$ | 3-$OCH_3$ | $CH_3$ | $OC_3H_7$—i | violet | 565 nm |
| 6 | 4-$OCH_3$<br>2-$OCH_3$ | 4-$CH_3$ | $C_4H_9$ | $OH/OCH_3$ | red | 530 nm |
| 7 | 4-$OCH_3$<br>3-$OCH_3$ | 4-$C_3H_7$—i | $C_3H_7$—n | $OC_3H_7$—i | red | 528 nm |
| 8 | 4-$OCH_3$<br>3-$OCH_3$ | 2-Cl | $CH_2$— 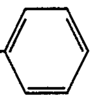 | $OH/OCH_3$ | orange-red | 510 nm |
| 9 | 4-$OCH_3$<br>5-Cl | 2-$OCH_3$ | $CH_3$ | $OH/OC_6H_{13}$ | claret | — |
| 10 | 4-$OCH_3$ | 2-$C_3H_7$—i<br>4-$C_3H_7$—i | $CH_3$ | $OH/OC_3H_7$—i | red | 485 nm |
| 11 | 4-$OCH(CH_3)_2$<br>2-$OCH(CH_3)_2$ | 2-$CH_3$ | $C_2H_5$ | $OC_6H_{13}$ | orange-red | — |
| 12 | 4-$SCH_3$<br>2-$CH_3$ | 4-$OCH_3$ | $C_2H_5$ | $OCH_2$—$C_6H_5$ | dark red-blue | — |
| 13 | 2-$OCH_3$<br>3-$OCH_3$<br>4-$OCH_3$ | 4-$OCH_3$ | $CH_3$ | $OC_4H_9$ | lilac-red | 556 nm |
| 14 | 4-$OC_2C_4OCH_3$ | 4-$OCH_3$ | $CH_3$ | $OC_2H_4OCH_3$ | red-violet | 554 nm |
| 15 | 4-$OC_4H_9$ | 4-$OCH_3$<br>3-$C_3H_7$—i<br>5-$C_3H_7$—i | $CH_3$ | OH | dark red-violet | 558 nm |
| 16 | 4-$C_{12}H_{25}$ | 4-$OCH_3$<br>2-$OCH_3$ | $CH_3$ | OH | raspberry red | 528 nm |
| 17 | 4-$OC_2H_5$ | 2-$OCH_3$<br>4-$CH_3$<br>5-Cl | $C_2H_5$ | $OC_2H_5$ | wine red | 544 nm |

EXAMPLE 6

A solution of 24.5 g (0.05 mol) of the dyestuff of the formula

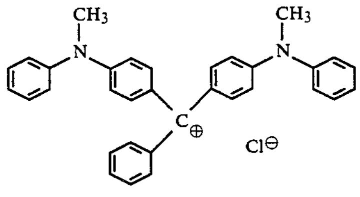

(18)

in 200 ml of methanol is added dropwise to a solution of 10.8 g (0.2 mol) of sodium methylate and 50 g of chloroparaffin ($C_{13}$–$C_{18}$-n-paraffin containing about 45% of chlorine) in 500 ml of methanol at 40° C. in the course of 30 minutes. The mixture is stirred at 40° C. for 2 hours and 250 ml of water are then added. The lower organic phase is separated off and washed with water and the residual water is removed in vacuo at 40° C. Filtration with suction gives 68 g of a pale yellow oil which, according to the $E_1^1$ measurement, contains 28% (78.7% of theory) of the carbinol base derivative of the formula

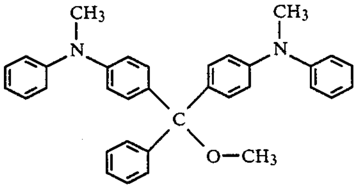

(19)

A strong green colour shade with $\lambda_{max}$=627 nm and $\lambda 2$=436 nm is developed in glacial acetic acid.

The solution can easily be diluted to the desired use concentration with kerosine ($C_{10}$–$C_{16}$-n-paraffins), dodecylbenzene, diisopropylnaphthalene or further chloroparaffin ($C_{13}$–$C_8$-n-paraffin containing about 48% of chlorine). When encapsulated in gelatine, polyamide, polyurethane or polyurea materials, the compound gives a colourless green with good fastness to light and ageing on acid clay or salicylate.

A mixture of the colour-forming agents of the formula (1) and (18) in a ratio of about 2:1 gives a deep neutral black with high ageing and CB stability on acid clay.

EXAMPLE 7

43.4 g (0.13 mol) of 4-(N-methyl-N-phenyl)amino-4'-methoxy-benzophenone, 95% pure, and 24.7 g (0.2 mol) of phosphorus pentoxide are added in succession to a solution of 23.8 g (0.13 mol) of N-methyldiphenylamine and 96.6 g (0.63 mol) of phosphorus oxychloride at room temperature. The immediately greenish-coloured reaction mixture is stirred at 50° C. for 20 hours. The melt is cooled to 20° C. and then dissolved in 500 ml of methanol, with thorough stirring. The temperature is kept below 50° C. by external cooling. 100 ml of toluene and 109 g of diiso-propylnaphthalene are added in succession to the methanolic dyestuff solution. 370 g (2.78 mol) of 30% strength sodium hydroxide solution are then added dropwise such that a temperature of about 40° C. is established. The mixture is then stirred at 40° C. for 3 hours. Thereafter, 200 ml of water are added and the aqueous phase which separates out as the lower phase is separated off. The toluene and residual water are removed azeotropically from the organic phase under a waterpump vacuum. The yellowish-brown colour-forming agent solution is filtered off and is ready for use in this form. Yield: 174.3 g, content: 36% of colour-forming agent (93.8% of theory, according to $E^1_1$ measurement in glacial acetic acid). The $^1$H-NMR spectrum shows that the colour-forming agent consists of a mixture of about 95% of carbinol base methyl ether of the formula

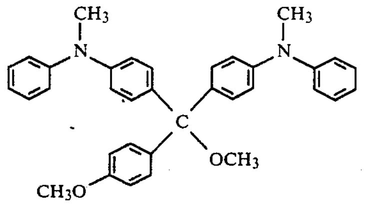

(20)

and about 5% of carbinol base of the formula (20, OH instead of $OCH_3$). A solution in glacial acetic acid becomes green with $\lambda_{max}$=612 nm and $\lambda_2$=478 nm. The solution can be diluted without problems to the customary use concentrations in recording materials with further diiso-propylnaphthalene, kerosine ($C_1$–$C_{16}$-n-paraffin) or white oil (62% n-paraffin/38% naphthene), and incorporated into microcapsules. Strong green colour shades are obtained on acid clay or bisphenol A. A mixture of the colour-forming agents of the formula (1) and (20) in a ratio of about 4:3 likewise gives a deep neutral black on acid clay.

EXAMPLE 8

20–30% strength solutions of the following colour-forming agents in chloroparaffin ($C_{13}$–$C_{18}$-n-paraffins containing about 45% by weight of chlorine), diiso-propylnaphthalene or linseed oil are also obtained in the same manner as described in the above Examples 6 and 7:

TABLE 2

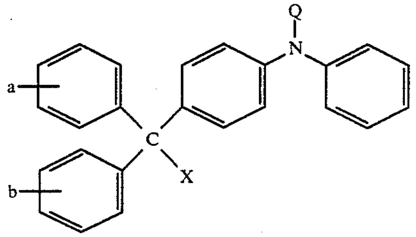

| Formula No. | a | b | Q | X | Colour shade on acid clay | $\lambda_{max}$, in glacial acetic acid |
|---|---|---|---|---|---|---|
| 21 | 4-$N(CH_3)_2$ 2-$OCH_3$ | 4-$OCH_3$ | $CH_3$ | $OCH_3$ | blue-green | 602 nm |
| 22 | 4-$N(C_2H_5)_2$ | 4-Cl | $C_3H_7$—i | O—$C_3H_7$—i | green | 616 nm |
| 23 | 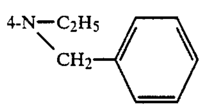 | 2-$OCH_3$ | $C_2H_5$ | O—$C_2H_5$ | green | 612 nm |
| 24 | 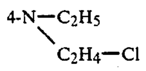 | 4-$OCH_3$ | $CH_3$ | (O—$C_2H_4)_2$—O—$CH_3$ | green | 610 nm |
| 25 | 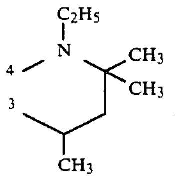 | 4-$OCH_3$ | $CH_3$ | OH/$OCH_3$ | dark green | 610 nm |

TABLE 2-continued

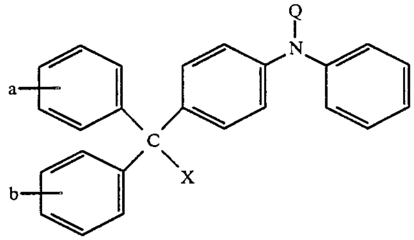

| Formula No. | a | b | Q | X | Colour shade on acid clay | $\lambda_{max}$, in glacial acetic acid |
|---|---|---|---|---|---|---|
| 26 | 4-N(CH$_2$—C$_6$H$_5$)$_2$ | — | CH$_3$ | O—C$_6$H$_{13}$ | green | 623 nm |
| 27 | 4-N(CH$_3$)$_2$<br>2-Cl | 4-OC$_4$H$_9$—t | CH$_3$ | OH/OCH$_3$ | turquoise | 608 nm |
| 28 | 4-N(CH$_3$)$_2$<br>3-CH$_3$<br>5-CH$_3$ | 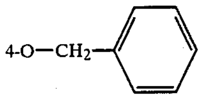 | CH$_3$ | OC$_4$H$_9$ | turquoise | 606 nm |
| 29 | 4-N(C$_2$H$_5$)$_2$ | 4-N(C$_2$H$_5$)$_2$ | C$_2$H$_5$ | OC$_2$H$_5$ | blue | 602 nm |
| 30 | 4-OCH$_3$ | 2-CH$_3$<br>4-N—C$_2$H$_5$<br>\ C$_2$H$_4$—Cl | CH$_2$—C$_6$H$_5$ | OC$_3$H$_7$—n | green | — |
| 31 | 4-OCH$_3$<br>2-OCH$_3$ | 4-N—C$_2$H$_5$<br>\| C$_2$H$_4$—CN | C$_2$H$_5$ | OH/OCH$_3$ | blue-green | — |
| 32 | / C$_2$H$_5$<br>4-N<br>\ CH$_2$—CH(CH$_3$)(CH$_3$) | 4-S—C$_6$H$_5$ | CH$_2$—CH=CH$_2$ | OC$_2$H$_5$ | dull green | — |
| 33 | 4-N(CH$_3$)$_2$<br>3-CH$_3$<br>5-CH$_3$ | 4-N(CH$_2$—C$_6$H$_5$)$_2$<br>2-OC$_2$H$_5$ | C$_4$H$_9$ | OH/OC$_2$H$_5$ | blue | 605 nm |
| 34 | 4-C$_{12}$H$_{25}$<br>2-CH$_3$ | 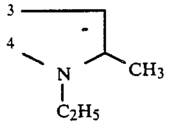 | C$_{12}$H$_{25}$ | OCH$_3$ | dull green | 620 nm |
| 35 | 4-OCH$_3$ | 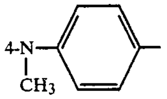 | CH$_3$ | OCH$_3$ | dark green | 614 nm |
| 36 | 4-Cl<br>2-Cl | 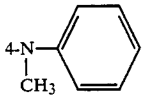 | CH$_3$ | OC$_4$H$_9$ | grass green | 620 nm |
| 37 | 4-OC$_2$H$_5$ | 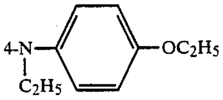 | CH$_3$ | OH/OCH$_3$ | dark green | 618 nm |
| 38 | 4-C$_5$H$_{11}$ | 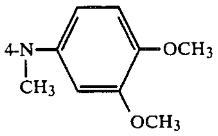 | CH$_3$ | OH/OCH$_3$ | very dark green | 625 nm |

TABLE 2-continued

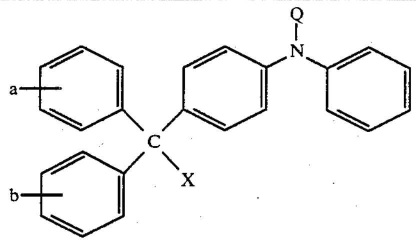

| Formula No. | a | b | Q | X | Colour shade on acid clay | $\lambda_{max}$, in glacial acetic acid |
|---|---|---|---|---|---|---|
| 39 | 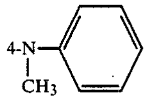 | 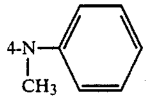 | $CH_3$ | OH/$OCH_3$ | blue | 609 nm |
| 40 | 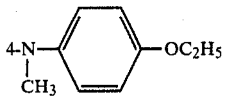 | 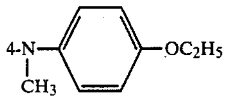 | $CH_3$ | $OC_2H_5$ | blue | 603 nm |
| 41 | 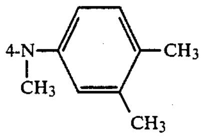 | 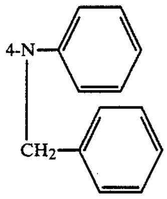 | 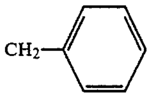 | $OCH_3$ | blue | 605 nm |
| 42 | 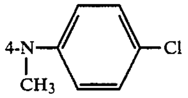 | 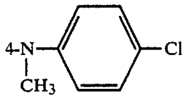 | $C_{12}H_{25}$ | $OC_3H_7$—i | blue | — |
| 43 | 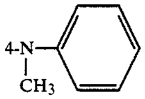 | 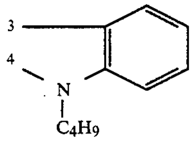 | $CH_3$ | OH/$OCH_3$ | blue | — |
| 44 | 4-$OC_2H_5$ | 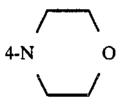 | $CH_3$ | $OC_2H_5$ | dark green | 614 nm |
| 45 | 4-$OCH_3$ 2-$OCH_3$ | 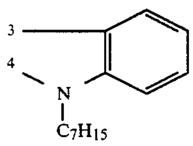 | $CH_3$ | $OCH_3$ | green | — |

EXAMPLE 9

31.5 g (0.13 mol) of 4,4'-dimethoxy-benzophenone and 28.4 g (0.2 mol) of phosphorus pentoxide are added to a solution of 29.6 g (0.13 mol) of 4-ethoxy-N-methyl-diphenylamine in 96.6 g (0.63 mol) of phosphorus oxychloride at room temperature. The immediately pale violet-coloured reaction mixture is warmed to 40° C. and stirred at this temperature for 6 hours. Thereafter, the melt is cooled to 20° C. and dissolved in 450 ml of methanol. The temperature is kept below 50° C. by external cooling. 500 g of 30% strength sodium methylate solution are added dropwise to the dyestuff solution taken, with vigorous stirring, such that a temperature of between 30°-35° C. is established. The dropwise addition time is about 2 hours. During this period, a pale beige, almost colourless precipitate separates out. The suspension is stirred at 30°-35° C. for 10-15 hours. It is cooled to 10°-15° C., 100 g of water are added, the mixture is filtered with suction and the residue is washed with methanol/water 1:1 and water in succession. 90.3 g of moist yield of the colour-forming agent

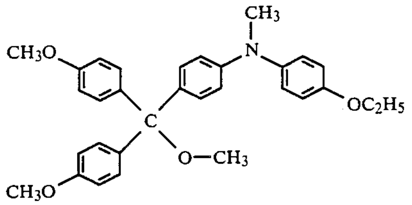

(46)

containing 35% of water (corresponding to 93.3% of theory) are obtained. When dissolved in 235 g of chloroparaffin ($C_{13}$-$C_{18}$-paraffin containing about 45% by weight of chlorine) and after removal of the residual water, a 20% strength solution which gives a deep dark red-violet dyeing with good fastness properties on acid clay is obtained.

After drying in vacuo at 40° C., a pale beige crystalline powder of melting point 116°-118° C. which develops a red-violet colour with a $\lambda_{max}$ of 557 nm and $\lambda_2$=428 nm in glacial acetic acid is obtained from the moist yield.

EXAMPLE 10

10-30% strength solutions of the following colour-forming agents are prepared in chloroparaffin ($C_{13}$-$C_{18}$-n-paraffin containing about 45% by weight of chlorine), diisopropylnaphthalene, diisopropylbiphenyl, linseed oil or sesame oil in the same manner as described in Example 9:

TABLE 3

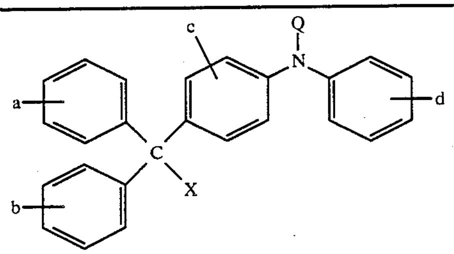

| Formula No. | a | b | c | d | Q | X | Colour shade on salicylate or phenolic resin | $\lambda_{max}$ in glacial acetic acid |
|---|---|---|---|---|---|---|---|---|
| 47 | 4-$OC_2H_5$ | 4-$OC_2H_5$ | — | 4-$OC_2H_5$ | $CH_3$ | OH | violet | 558 nm |
| 48 | 4-$OCH_3$ | 4-$OCH_3$ | — | 4-$OC_2H_5$ | $CH_3$ | $OC_3H_7$—n | violet | 552 nm |
| 49 | 4-$OCH_3$ | 4-$SCH_3$ | — | 4-$OC_2H_5$ | $CH_3$ | $OCH_3$ | dark violet | 568 nm |
| 50 | 4-$OC_4H_9$ | 3-$CH_3$<br>4-$N(CH_3)_2$ | — | 4-$OC_2H_5$ | $CH_3$ | OH/$OCH_3$ | turquoise | 618 nm |
| 51 | 4-$OC_2H_5$ | 2-$OCH_3$<br>4-$SC_2H_5$ | — | 4-$OC_2H_5$ | $CH_3$ | OH | blue-violet | 570 nm |
| 52 | 4-$C_3H_7$—i | 4-$N(C_2H_5)_2$ | — | 4-$OC_2H_5$ | $C_3H_7$—i | OH | green | 626 nm |
| 53 | 2-$CH_3$<br>4-$OCH_3$ | 4-$OCH_3$<br>3-$OCH_3$ | — | 4-$OCH_3$<br>2-$OCH_3$ | $CH_3$ | OH/$OCH_3$ | dark violet | 564 nm |
| 54 | 4-$OCH_3$ | 4-$OCH_3$<br>2-$OCH_3$ | — | 4-$OCH_3$<br>3-$OCH_3$ | $C_4H_9$ | $OC_4H_9$ | dark violet | 568 nm |
| 55 | 4-$OCH_3$ | 4-$OCH_3$<br>3-$OCH_3$ | 2-$OC_2H_5$ | 4-$OC_2H_5$ | $C_2H_5$ | $OC_3H_7$—i | lilac | 566 nm |
| 56 | 4-$OCH_3$<br>2-Cl | 4-$N(C_5H_{11})_2$ | 2-$OC_2H_5$ | 4-$OC_2H_5$ | $C_2H_5$ | $OC_2H_5$ | green | 615 nm |
| 57 | 4-$OCH_2$—$C_6H_5$ | 4-$OCH_2$—$C_6H_5$ | 2-$OCH_3$ | 4-$CH_3$ | $CH_3$ | 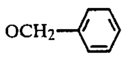 | violet | 552 nm |
| 58 | 4-$OC_2H_4OCH_3$ | 4-N—$C_2H_4OCH_3$<br>$C_2H_5$ | 2-$C_2H_5$ | 4-Cl | $C_2H_5$ | OH | green | 613 nm |
| 59 | 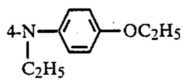 | 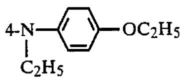 | — | 4-$OC_2H_5$ | $C_2H_5$ | $OC_2H_5$ | blue | — |
| 60 | 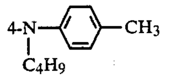 | 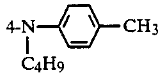 | — | 4-$CH_3$ | $C_4H_9$—n | OH/$OCH_3$ | blue | |
| 61 | 4-$OC_2H_5$<br>3-$C_3H_7$—i | 4-$C_3H_7$—i<br>2-$C_3H_7$—i | — | 4-$C_6H_5$ | $CH_3$ | $OC_3C_7$—i | red-violet | |
| 62 | 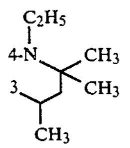 | 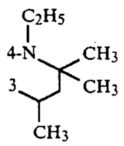 | 2-$OCH_3$ | 4-$OCH_3$<br>2-$CH_3$ | $C_4H_9$—n | $OC_2H_5$ | blue | |

EXAMPLE 11

A mixture of 10 g of a 20% strength solution of the compound of the formula (1) in diisopropylnaphthalene and 3.6 g of a 28% strength solution of the compound of the formula (18) in diisopropylnaphthalene are encapsulated with 86.4 g of kerosine in a manner which is known per se with gelatine and gum arabic by coacervation, the capsules are mixed with starch solution and a sheet of paper is coated with the mixture.

The front side of a second sheet of paper is coated with acid-activated bentonite as a colour developer. The first sheet and that containing the colour developer are placed adjacent to one another. Writing by hand or with a typewriter on the first sheet exerts pressure, and an intense black copy which is outstandingly fast to light develops on the sheet coated with the developer.

EXAMPLE 12

3% solutions with the following composition are prepared from the colour-forming agents prepared according to the above examples:

a. a colour-forming agent mixture of the formula

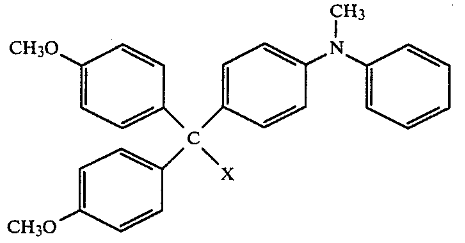

60% of which has X=OH and
40% of which has X=$-OCH_3$
in diisopropylnaphthalene, b. a colour-forming agent mixture of the formula

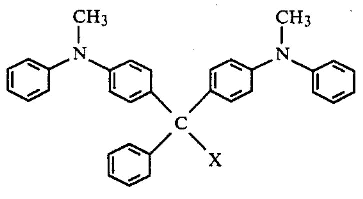

60% of which has X=$-OH$ and
40% of which has X=$-OCH_3$
in diisopropyldiphenyl, c. a colour-forming agent mixture of 55% of the colour-forming agent mixture a. and 45% of the colour-forming agent mixture b. in diisopropylnaphthalene.

223 parts by weight of solutions a. b. and c. are mixed with 39.5 parts by weight of the diisocyanate of the formula

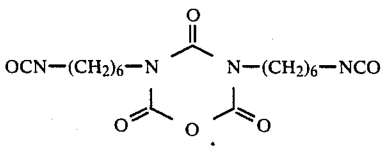

The mixture is then mixed with 320 parts by weight of an aqueous, 0.5% solution of a partly saponified polyvinyl acetate. The mixture is dispersed to form an emulsion with an average drop size of 7 μm under a shear gradient of a rotor/stator emulsifying apparatus. 76 parts of a 9.0% aqueous diethylenetriamine solution are added with stirring to the emulsion formed. In order to allow the microcapsule dispersion to finish reacting it is heated to 60° C. and kept at this temperature for 3 hours. A 40% aqueous microcapsule dispersion is obtained.

EXAMPLE 13

250 ml of the 40% microcapsule dispersion obtained with mixture c. according to Example 12 are initially introduced. While stirring vigorously 40 g of finely ground cellulose (®Arbocell BE 600/30 manufactured by Rettenmeier und Söhne) are dispersed slowly therein. After stirring vigorously for at least 30 minutes 40 ml of a 50% SBR latex (®Baystal D 1600 manufactured by BAYER AG) are added. The resulting 48.5% brushing paint is diluted with water to a 30% solids content and is brushed on to the reverse side of a commercially available base paper. The coat is 5 g/m$^2$ when dry. If this paper is written on an intensive black copy is obtained on a commercially available carbon-free paper.

We claim:

1. Highly concentrated solutions of color-forming agents wherein said solutions contain a color-forming agent of the formula

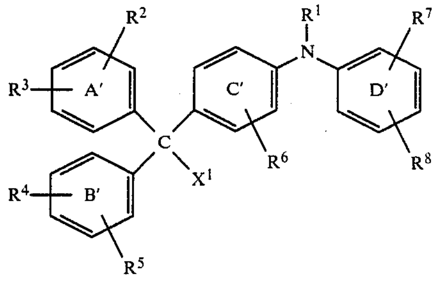

wherein $X^1$ denotes hydroxyl, $C_1$–$C_{12}$-alkoxy which is optionally substituted by chlorine or $C_1$–$C_4$-alkoxy, $C_2$–$C_{12}$-alkenyloxy, benzyloxy which is optionally substituted by $C_1$–$C_4$-alkyl, $C_1$–$C_4$-alkoxy or halogen or phenethyloxy, $R^1$ denotes $C_1$–$C_{12}$-alkyl or benzyl, $R^2$, $R^4$, $R^6$ and $R^7$ independently of one another denote hydrogen, chlorine, $C_1$–$C_{12}$-alkyl, $C_1$–$C_{12}$-alkoxy, phenoxy, benzyloxy or a radical of the formula

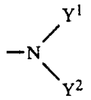

$R^3$, $R^5$ and $R^8$ independently of one another denote hydrogen, chlorine, $C_1$–$C_{12}$-alkyl, $C_2$–$C_{12}$-alkenyl, $C_1$–$C_{12}$-alkoxy or $C_2$–$C_{12}$-alkenyloxy, or phenyl, benzyl, phenoxy or benzyloxy which is optionally substituted by chlorine, $C_1$–$C_{12}$-alkyl or $C_1$–$C_{12}$-alkoxy, or cyclohexyloxy or cyclopentyloxy which is optionally substituted by $C_1$–$C_{12}$-alkyl, or $C_1$–$C_{12}$-alkylmercapto or a radical of the formula

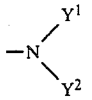

$Y^1$ and $Y^2$ independently of one another denote $C_1$–$C_{12}$-alkyl which is optionally substituted by chlorine, cyano, $C_1$–$C_4$-alkoxycarbonyl or $C_1$–$C_4$-alkoxy, or cyclohexyl, phenyl or benzyl, which can be substituted by chlorine, $C_1$–$C_{12}$-alkyl or $C_1$–$C_{12}$-alkoxy, or $R^2$ and $R^3$ denote members which, together with ring A', and/or $R^4$ and $R^5$ denote members, which, together with ring B', are necessary to complete a ring system of one of the following formulae

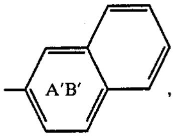
,
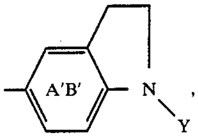
,

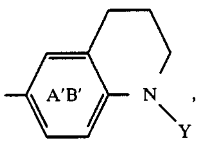
,
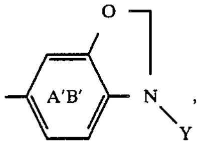
,

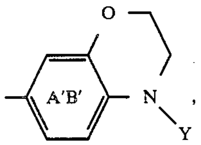
,
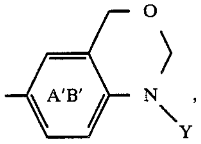
,

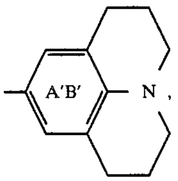
,
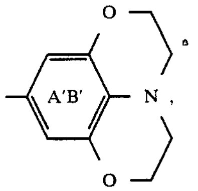
,

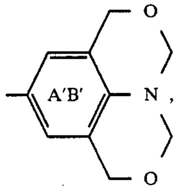
,
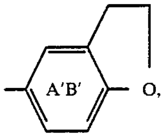
,

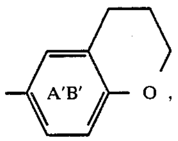
,
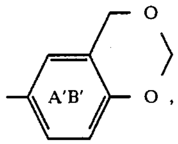
,

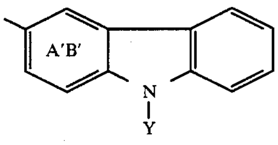
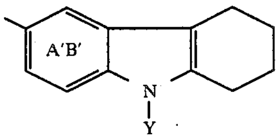

-continued

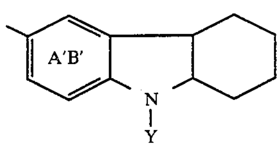
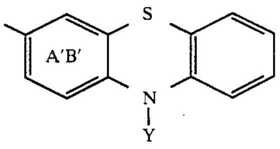

wherein

Y represents $C_1$–$C_{12}$-alkyl, which can be substituted by chlorine, cyano, $C_1$–$C_4$-alkoxycarbonyl or $C_1$–$C_4$-alkoxy, or cyclohexyl, phenyl or benzyl, which can be substituted by chlorine, $C_1$–$C_{12}$-alkyl or $C_1$–$C_{12}$-alkoxy, and the saturated ring component can carry up to 4 radicals from the group comprising chlorine, $C_1$- to $C_4$-alkyl, $C_1$- to $C_4$-alkoxy and phenyl, or

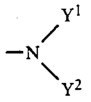

denotes a pyrrolo, pyrrolidino, piperidino, pipecolino, morpholino, pyrazolo or pyrazolino radical which is optionally substituted by chlorine, $C_1$–$C_4$-alkyl or phenyl and water-insoluble organic solvents from the group comprising optionally chlorinated hydrocarbons, vegetable oils and phthalic acid esters.

2. Highly concentrated solutions according to claim 1, wherein said solution contain a color forming agent of the formula

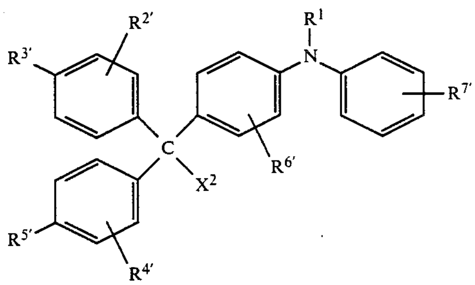
III wherein $X^2$ denotes hydroxyl or $C_1$–$C_{12}$-alkoxy, $R^{3'}$ denotes hydrogen, chlorine, $C_1$–$C_{12}$-alkyl, $C_1$–$C_{12}$-alkoxy, benzyloxy, phenoxy or a radical of the formula

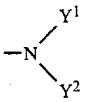

$R^{5'}$ denotes $C_1$–$C_{12}$-alkoxy, benzyloxy or a radical of the formula

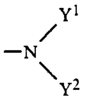

$R^{2'}$, $R^{4'}$, $R^{6'}$ and $R^{7'}$ independently of one another denote hydrogen, chlorine, $C_1$–$C_{12}$-alkyl, $C_1$–$C_{12}$-alkoxy, $C_1$–$C_4$-alkylamino or di-$C_1$–$C_{12}$-alkylamino, or $R^{2'}$ and $R^{3'}$ denote members which, together with the benzene ring to which they are bonded, are required to complete a ring system of one of the formulae

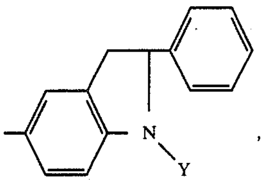
,
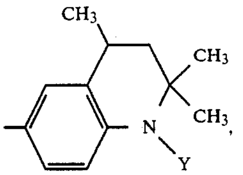
,

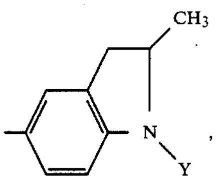
,
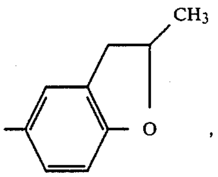
,

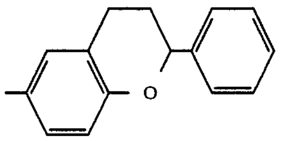
or

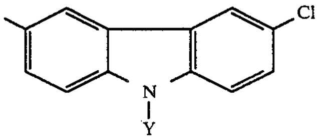

and $R^1$, Y, $Y^1$ and $Y^2$ have the meaning given in claim 1.

3. Highy concentrated solutions according to claim 1, wherein said solution contain a color forming agent of the formula

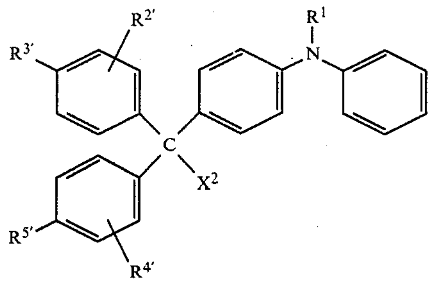

wherein $R^1$, $X^2$ and $R^{3'}$-$R^{5'}$ have the meaning given in claim 1 or claim 2.

4. Highly concentrated solutions according to claim 1, wherein said solutions contain, as water-insoluble organic solvents, $C_{10}$–$C_{20}$—n— or -iso-paraffins, $C_{10}$–$C_{17}$-chloroparaffins with a chlorine content of 15–70% by weight, kerosine, white oil, aromatic hydrocarbons which contain alkyl groups, vegetable oils or dialkyl phthalates.

5. Process for the preparation of concentrated solutions of claim 1, wherein dyestuff salts of the formula

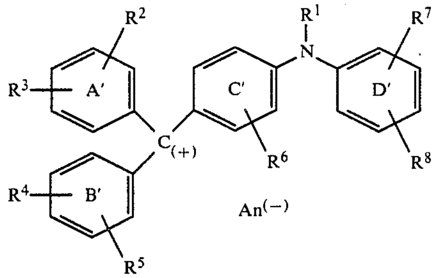

are reacted with bases of the formula

MeX

Me denotes an alkali metal or alkaline earth metal, in particular sodium or potassium, and $An^{(-)}$ denotes an anion from the series comprising Cl, Br, acetate, sulphate, phosphate and

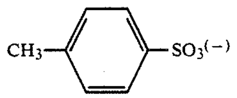

and either (a) the reaction is carried out in the presence of the water-insoluble organic solvent of claim 1, and, after the reaction—if appropriate after addition of water—the layer consisting of the solution of the color-forming agent is separated off, or (b) the reaction is carried out in the absence of the water-insoluble organic solvent of claim 1, the color-forming agent is separated off from the reaction medium after the reaction and the water-insoluble solvent is then added.

* * * * *